Aug. 11, 1925.
F. J. MacDONALD
1,549,494
LAMINATED ARTICLE AND METHOD OF MAKING THE SAME
Filed Aug. 23, 1921
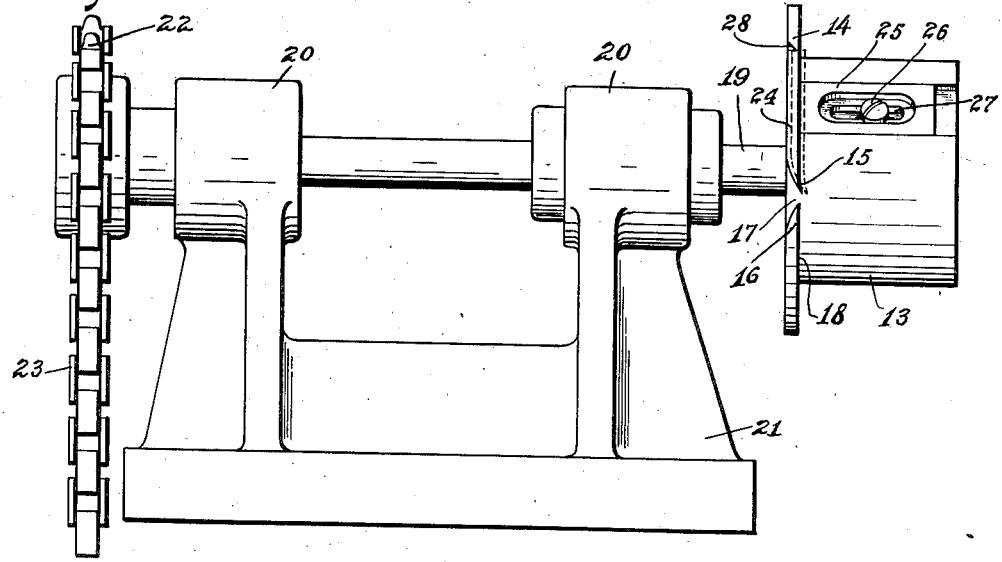
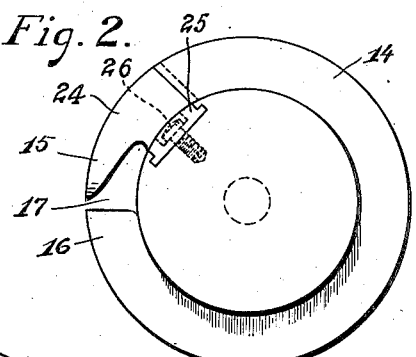
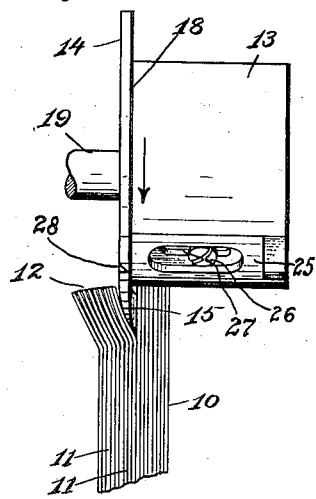
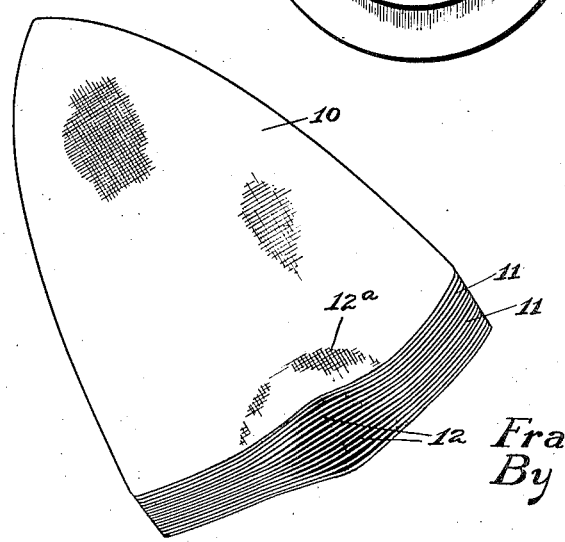
Inventor
Frank J. MacDonald.
By Robert M Pierson
Atty.

Patented Aug. 11, 1925.

1,549,494

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

LAMINATED ARTICLE AND METHOD OF MAKING THE SAME.

Application filed August 23, 1921. Serial No. 494,723.

*To all whom it may concern:*

Be it known that I, FRANK J. MACDONALD, a citizen of the United States, residing at Akron, in the county of Summit and State of Ohio, have invented a certain new and useful Laminated Article and Method of Making the Same, of which the following is a specification.

This invention relates to the art of handling stacks or piles of sheet material, and more particularly pieces of fabric coated with rubber friction or other adhesive, an example being a stack of similar stamped or died-out pieces for the lining of a rubber boot or shoe.

My object is to initiate the separation of the plies or pieces throughout the stack or throughout a predetermined portion thereof in order to facilitate the subsequent complete separation of said plies one at a time, the partial separation being effected, for example, as a preliminary to an operation such as cementing the edges of the pieces one after another.

Of the accompanying drawings:

Fig. 1 is a side elevation of a machine including a ply-separating tool constructed in accordance with and adapted for the practice of my invention.

Fig. 2 is an end elevation of the rotary tool.

Fig. 3 is a side elevation showing the tool at work upon the laminated stack, and Fig. 4 is a perspective view showing approximately the appearance of the stack after the operation of the tool.

In the drawings, 10 is my improved article of manufacture comprising a stack or pile of similar pieces adapted to form part of the lining of a rubber shoe. These pieces may be of any shape suited to their purpose, preferably are died or stamped out of fabric in any suitable manner, and may, for example, have a friction coating of raw rubber on one side so that they adhere to each other slightly by reason of the tackiness of the rubber coating. 11, 11 are individual pieces or plies. As a result of the operation of the tool hereinafter described, these individual plies are partially separated from each other at 12, along an arcuate segment 12ª, throughout the depth or thickness of the stack.

The ply-separating tool comprises a cylindrical hub portion 13 forming a radial abutment or stop for the edge of the stack which determines the depth of penetration of the separating blade in a direction parallel to the plies, and a radial flange or blade 14 at the inner end of said cylindrical hub, this blade being approximately in the form of a nearly closed letter C or partial annulus whose leading end 15 is separated from its trailing end 16 by a narrow gap 17 and is made thin-edged and pointed, and slightly offset or turned forwardly across the general plane of the frontal face 18 of said blade.

This leading end may be made adjustable transversely of the blade, as shown, to vary its position for different thicknesses of plies, by forming it on a movable blade section 24 which is secured to the rear end of a dovetailed slide 25, the latter being mounted in an undercut groove on the hub portion 13 and adapted to be secured in different adjustments thereon by a screw 26 whose stem occupies a slot 27 in the slide, the leading end of the fixed portion of the blade being beveled at 28 so as to avoid catching on the work when the adjustable section is moved forward to the dotted-line position for a thicker ply.

The separating tool is secured to the forward end of a shaft 19 mounted in bearings 20, 20 on a frame 21, and the shaft is driven from its rear end by a sprocket 22 and chain 23.

The separation of the plies is effected by bringing one edge of the stack 10 against the cylindrical portion 13 of the tool and bringing one face thereof against the frontal face 18 of the separating blade 14. Said blade acts as a screw-thread whose pitch is localized at the leading end 15 of the blade and is equal to the thickness of one of the plies 11, so that as said leading end repeatedly comes around to the stack it enters successively between adjacent plies and separates them throughout an area equal to the segment of penetration of the blade into the stack until it has worked its way through the stack. This operation is rapidly and easily performed, and results in the saving of considerable time and labor in the subsequent complete separation of the successive plies from the upper surface of the stack in the course of any treatment to which they may be subjected, such as cementing the edges, the arcuate shape of each free portion favoring the easy picking off of the ply by the operator's fingers.

I claim:

1. An article of manufacture comprising a stack composed of a multiplicity of pieces of sheet material adhesively-coated throughout their extent, contiguous pieces adhering to each other except at one zone where the adhesion has been broken throughout the depth of the stack.

2. An article of manufacture comprising a stack composed of a multiplicity of adhesively-coated, die-cut pieces of fabric, the plies of said stack adhering except at one point where the adhesion between adjacent plies is broken throughout the depth of the stack over an arcuate segment.

3. The herein described method of producing a laminated article, which comprises successively initiating the separation of the plies of a stack of adhering pieces of sheet material throughout a determinate, marginal zone of the stack, while leaving said plies adhering together in another zone.

4. The herein described method of producing a laminated article which comprises successively initiating the separation of the plies of a stack of adhering pieces of sheet material throughout a determinate, marginal zone of the stack and throughout the depth of said stack while leaving said plies adhering together in another zone.

In witness whereof I have hereunto set my hand this 19th day of August, 1921.

FRANK J. MacDONALD.